United States Patent [19]

Chr. Mahlick et al.

[11] Patent Number: 4,969,393
[45] Date of Patent: Nov. 13, 1990

[54] APPLIANCE WITH WATER SOFTENING FACILITY

[75] Inventors: Gotthard Chr. Mahlick, Kronberg; Michael Borgmann, Solingen, both of Fed. Rep. of Germany

[73] Assignee: Robert Krups Stifting & Co. KG, Solingen, Fed. Rep. of Germany

[21] Appl. No.: 407,057

[22] Filed: Sep. 14, 1989

Related U.S. Application Data

[63] Continuation-in-part of Ser. No. 239.192, Aug. 31, 1988, Pat. No. 4,889,041, and Ser. No. 239,211, Aug. 31, 1988, Pat. No. 4,893,422.

[30] Foreign Application Priority Data

Sep. 5, 1987 [DE] Fed. Rep. of Germany ....... 3729773
Sep. 5, 1987 [DE] Fed. Rep. of Germany ....... 3729800

[51] Int. Cl.$^5$ .............................................. A47J 31/00
[52] U.S. Cl. ....................................... 99/285; 99/286; 38/77.8
[58] Field of Search ................. 99/279, 285, 286, 290, 99/298, 323.3, 323.1, 300, 307, 304, 484; 426/433; 38/77.1, 75, 77.5, 77.8, 77.9; 252/175

[56] References Cited

U.S. PATENT DOCUMENTS

| | | | |
|---|---|---|---|
| 4,070,956 | 1/1978 | Brown | 99/323.3 |
| 4,444,675 | 4/1984 | Goeldner | 252/175 |
| 4,532,411 | 7/1985 | Terraillon | 38/77.8 |
| 4,565,019 | 1/1986 | Cavalli | 38/77.6 |

OTHER PUBLICATIONS

"Chemie Lexikon", Dr. Hermann Rompp, 1952, p. 843.

*Primary Examiner*—Robert W. Jenkins
*Attorney, Agent, or Firm*—Peter K. Kontler

[57] ABSTRACT

An electric steam iron, tea making machine of coffee making machine contains a supply of water softening agent which is contacted by tap water issuing from a container whereby the volume of the supply of softening agent increases when its water softening capacity is reduced or exhausted. A monitoring device generates signals when the supply of softening agent expands to indicate that a fresh supply must be inserted into the appliance. The supply can be confined in a bellows, and the monitoring device can be designed to generate visible signals in response to detected expansion of the bellows as a result of a reduction or exhaustion of the water softening capacity of the confined supply of softening agent.

10 Claims, 1 Drawing Sheet

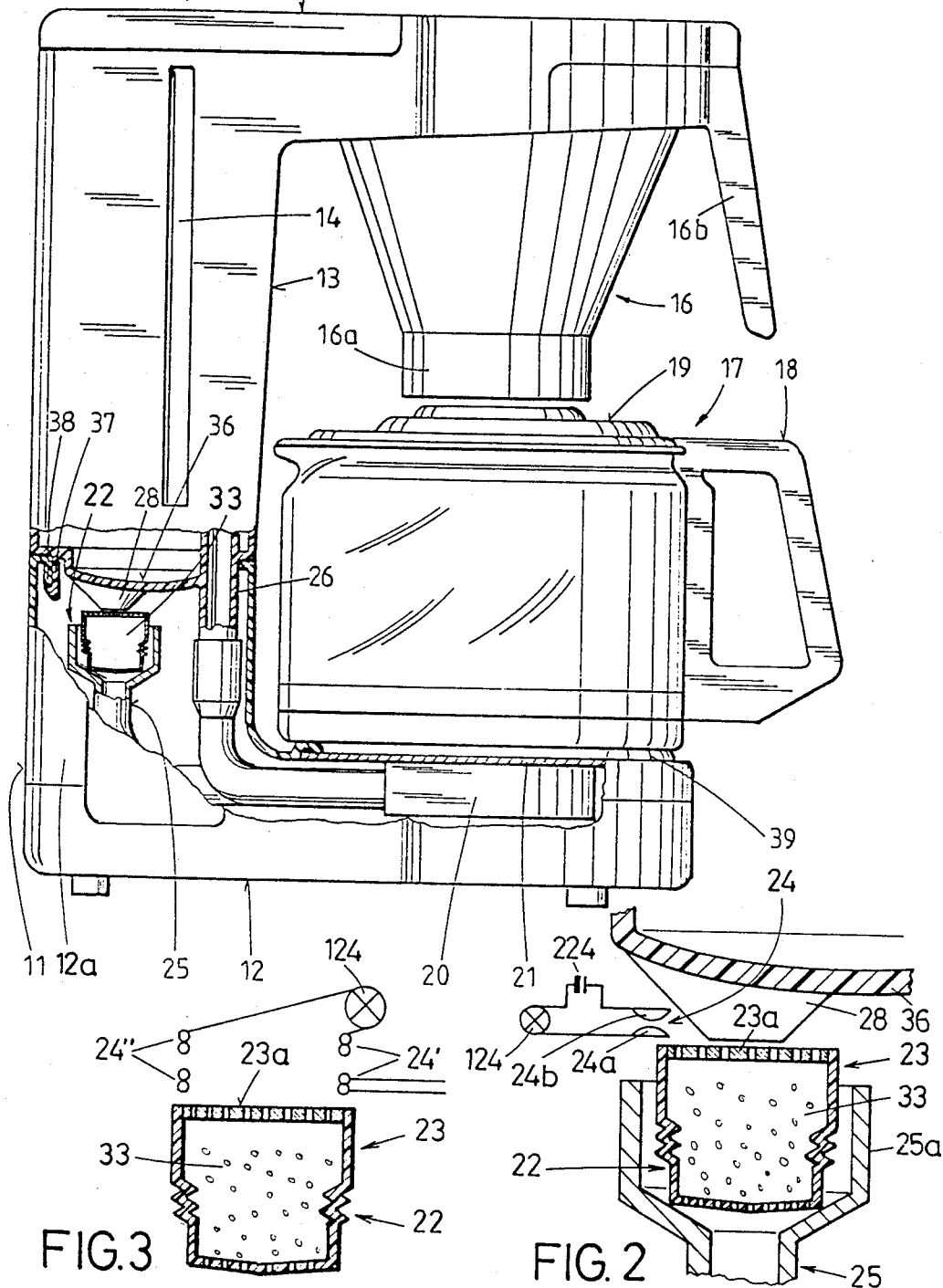

APPLIANCE WITH WATER SOFTENING FACILITY

CROSS-REFERENCE TO RELATED CASES

This is a continuation-in-part of our copending patent application Ser. No. 239,192 filed Aug. 31, 1988 for "Electric appliance for making hot beverages", now U.S. Pat. No. 4,889,041 granted DEC. 26, 1989, and of our copending patent application Ser. No. 239,211 filed Aug. 31, 1988 for "Steam iron with water softening facility", now U.S. Pat. No. 4,893,422 granted Jan. 16, 1990.

BACKGROUND OF THE INVENTION

The invention relates to appliances in general, and more particularly to improvements in appliances which process or consume water, particularly tap water. Still more particularly, the invention relates to improvements in electrical appliances which are provided with water softening facilities.

Commonly owned copending patent application Ser. No. 239,192 discloses an electric coffee making machine which heats tap water and wherein a stream of water is softened on its way from the container for a body of fresh tap water toward an electric heater prior to coming in contact with a supply of flavoring agent, such as comminuted coffee beans. This prevents the development of scale in the pipes, conduits and like parts of the appliance. The color of softening agent changes when its water softening capacity is reduced or exhausted, and the appliance is provided with means for permitting observation of the supply of softening agent so that the change of color can be detected for the purpose of replacing the partially or fully exhausted supply with a fresh supply of softening agent. The supply of softening agent can be installed in such a way that it can be observed and its color ascertained while in the operative position and/or that it is readily removable from the appliance in order to permit observation of its color.

Commonly owned copending patent application Ser. No. 239,211 discloses an electric steam iron wherein the stream of tap water which is to be heated and converted into steam is softened as a result of contact with a supply of softening agent. The softening agent is observable in the housing of the steam iron or upon removal from the housing in order to permit observation of its color. This enables the person in charge to replace the supply of softening agent when the color of the softening agent indicates that its water softening capacity is reduced or exhausted.

The just described appliances operate quite satisfactorily and the detection of the color of a supply of softening agent can be ascertained by the simple expedient of observing the supply in the appliance, by exposing the partially or fully concealed supply or by removing the supply from the appliance. However, there is no automatic indication or warning that the supply of softening agent should or must be replaced because it is no longer effective or because it is no longer capable of satisfactorily softening the stream or streams of water which are conveyed to a water heater or to another water processing or consuming component of the appliance.

OBJECTS OF THE INVENTION

An object of the invention is to provide a water consuming or processing appliance which is constructed and assembled in such a way that it automatically informs the user that the supply of water softening agent should be inspected or replaced.

Another object of the invention is to provide an electric tea making machine, an electric coffee making machine, an electric cappuccino making machine, an electric espresso making machine or an electric steam iron wherein a reduction or exhaustion of the water softening capacity of a supply of softening agent automatically entails the generation of a visible, audible and/or other detectable signal to ensure that such supply can be replaced or replenished in time prior to deposition of scale in the conduits, pipes and/or other parts of the appliance.

A further object of the invention is to provide an appliance wherein the detection of a reduction or exhaustion of the water softening capacity of a supply of softening agent does not require visual inspection of the supply of softening agent in or removal of such supply from the appliance.

An additional object of the invention is to provide a novel and improved method of and novel and improved means for monitoring the condition of water softening agent in an appliance.

SUMMARY OF THE INVENTION

The invention is embodied in an appliance (e.g., in a machine for brewing coffee or tea, in a cappuccino or espresso maker or in a steam iron) which comprises a vessel (e.g., a container) serving to store a body of water (such as magnesium- and/or calcium-containing tap water) and having a water outlet, means for softening water which issues from the water outlet including a supply of water softening agent which is contacted by water, e.g., in the region of the outlet, and the composition of which is such that its volume changes when its water softening capacity is reduced or exhausted, and means for monitoring the volume of the supply of softening agent. The monitoring means preferably includes means for generating signals which denote the changes of volume of the supply of softening agent. Such signal generating means can include means for generating visible, audible and/or other detectable signals.

The composition of the supply of softening agent is or can be such that the volume of the supply increases when the water softening capacity of the agent is reduced or exhausted, and the water softening means which employs such softening agent can further comprise a deformable permeable receptacle (e.g., a bellows) for the supply of softening agent. The receptacle can include a portion which moves along a predetermined path in response to expansion of the supply of softening agent, and the monitoring means can comprise means for generating signals which denote the increase of volume of the supply of softening agent. The signal generating means can include a portion which is located in such path and is displaceable by the aforementioned movable portion of the receptacle.

The outlet of the vessel is or can be located at a level above the supply of softening agent, and the outlet can discharge one or more streams of water by gravity flow.

The appliance further comprises at least one water consuming or processing device and means for conveying softened water from the softening means to the at least one consuming or processing device. The consuming or processing device can include one or more electric water heaters, e.g., one or more electric resitance heaters, halogen lamps and/or thick film conductors.

The novel features which are considered as characteristic of the invention are set forth in particular in the appended claims. The improved appliance itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a partly elevational and partly vertical sectional view of an appliance which embodies one form of the invention and wherein a supply of water softening agent is confined in a bellows beneath the outlet of a container for a body of tap water;

FIG. 2 is an enlarged view of a detail in the appliance of FIG. 1, showing one form of means for generating signals in response to expansion of the bellows; and FIG. 3 is a similar view but showing modified signal generating means.

DESCRIPTION OF PREFERRED EMBODIMENTS

FIG. 1 shows an electrical appliance in the form of a coffee making machine 10 with a housing 11 which includes a horizontal portion or base 12 and an upright portion 12a carrying a container or vessel 13 for a supply of tap water. The top wall 15 of the container 13 is detachable, pivotable or otherwise movable to an inoperative position in which the container can receive a supply of fresh tap water. An elongated vertical window 14 in the container 13 enables the user of the machine 10 to ascertain the momentary level of water above a bottom wall 36 with an outlet 28 for a stream of tap water.

The base 12 of the housing 11 contains an electric heater 20 (e.g., an electric resistance heater) beneath a detachable plate-like support 21 for a warming plate 39. The latter serves to maintain the temperature of freshly brewed beverage in a vessel 17 (e.g., a standard coffee pot) at or above a predetermined minimum temperature. The pot 17 has a handle 18 and a detachable apertured lid or cover 19 beneath the outlet 16a of a funnel-shaped device 16 constituting a filter holder and serving to confine a supply of flavoring agent, such as comminuted coffee beans. The filter holder 16 can be fully detached from the housing 11 or is simply pivoted to a position in which it is ready to accept a fresh supply of flavoring agent. A handgrip portion 16b facilitates manipulation of the filter holder 16.

The outlet 28 of the container 13 can discharge a stream of tap water by gravity flow into a first conduit 25 beneath a water softening unit 22 including a supply 33 of water softening agent. The stream of softened water enters the upper end portion 25a of the conduit 25, and the latter admits water into a second conduit 27 extending through the electric heater 20 and discharging heated water into the lower end of a riser (third conduit) 26. The upper end of the riser 26 admits hot water into the filter holder 16 wherein hot water contacts the supply of flavoring agent, and the resulting freshly brewed beverage is evacuated via outlet 16a to flow through an aperture in the cover 19 and to gather in the pot 18 in which it is maintained at a desired temperature by the warming plate 39. The heater 20 can be turned off when the brewing of a selected quantity of hot coffee is completed. The pot 17 can be provided with customary indicia denoting the number of cupfuls of hot coffee in its interior. As a rule, at least a portion of the pot 17 will be made of a light-transmitting material. The heretofore described parts of the machine 10 are known, for example, from the aforementioned commonly owned copending patent application Ser. No. 239,192 to which reference may be had if necessary.

The present invention is embodied in the water softening unit 22, in the manner of its mounting in the housing 11 of the machine 10, and in its cooperation with the bottom wall 36 of the container 13 and with the conduit 25. The supply 33 of softening agent is selected in such a way that its volume changes when its water softening capacity is reduced or exhausted. For example, the volume of a water softening agent which is a cationic ion exchanger will increase when its water softening capacity is reduced or exhausted. A suitable cationic ion exchanger is $SO_3Na$ which breaks up into $SO_3-$ and $Na+$ when put to use as a water softening agent. Reference may be had to page 843 of "Chemie Lexikon" by Dr. Hermann Römpp.

The machine 10 further comprises means for monitoring the volume of the supply 33 of softening agent and for generating signals when the volume of the supply of softening agent changes. FIG. 2 shows that the supply 33 of softening agent is confined in an expandible (deformable) receptacle 23 in the form of a bellows which is installed in the upper end portion 25a of the conduit 25 and the upper portion 23a of which moves upwardly along a vertical path in automatic response to a reduction or complete exhaustion of the water softening capacity of the supply 33 of softening agent. The monitoring means which is shown in FIG. 2 comprises a simple electric switch 24 with a fixed upper contact 24a and a movable lower contact 24b in the path of upward movement of upper portion 23a of the bellows 23. The circuit of the switch 24 includes an energy source 224 and a signal generator 124 in the form of a simple lamp capable of emitting a visible signal in response to completion of the circuit. Such completion takes place when the upper portion 23a of the bellows 23 rises and closes the switch 24. The visible signal is detected by the operator as soon as the plug of the electric cable (not shown) of the machine 10 is inserted into an outlet or as soon as the circuit of the switch 24 and signal generator 124 is completed in any other way. Thus, the operator is warned to replace the exhausted supply 33 of softening agent with a fresh supply, either with or without the bellows 23.

The lamp 124 can be replaced by or used jointly with another suitable signal generator, e.g., a device which is designed to produce an audible signal. Furthermore, the monitoring means can include two or more lamps which are suitably distributed on or in the housing 11 in order to ensure immediate detection of the generation of signals as soon as the supply 33 of softening agent necessitates replacement or replenishment. The length of the conductor means between the switch 24 and the signal generator 124 of FIG. 2 can be selected practically at will. For example, the signal generator 124 can be installed next to the customary on-off switch on the housing 11 irrespective of the distance of the on-off switch from the water softening unit 32 and the switch 24.

The container or vessel 13 is releasably secured to the housing portion 12a by cooperating male and female detent elements 37, 38. When the container 13 is detached from the housing 11, the bellows 23 is accessible for inspection or replacement.

FIG. 3 shows the water softening unit 32 (including the bellows 23 and the supply 33 of softening agent which expands in response to a reduction or exhaustion of its water softening capacity) and modified monitoring means wherein the upper portion 23a of the bellows 23 must close two switches 24', 24" in order to complete the circuit of a signal generating device 124, e.g., a lamp. The energy source which is in circuit with the switches 24', 24" and with the signal generating lamp 124 has been omitted in FIG. 3 for the sake of clarity.

An advantage of the water softening unit 22 and of the monitoring means of FIG. 2 or 3 is that the imminent or actual reduction or exhaustion of the capacity of the supply 33 of softening agent to soften the stream of water which is caused or permitted to flow from the outlet 28 of the container 13 into the conduit 25 is more readily detectable than if the operator were compelled to observe the color of softening agent. However, it is equally within the purview of the invention to design the water softening unit 22 in such a way that the supply 33 of softening agent in the bellows 23 is observable at all times so that, if the nature of softening agent is such that its color changes in response to partial or complete exhaustion of its water softening capacity, the operator of the machine 10 can ascertain the condition of softening agent by noting the signal which is generated by the lamp 24 or by deciding to observe the color of the supply of softening agent. As explained in the aforementioned copending patent applications, the supply of softening agent can be confined in a light-transmitting receptacle or the receptacle and the adjacent portion of the housing can transmit light so that the color of the softening agent can be ascertained without removing the receptacle for softening agent from the housing.

Another advantage of the water softening unit 22 and of the monitoring means of FIG. 2 or 3 is that the bellows 23 (or another deformable receptacle for the supply 33 of softening agent) need not be made of a light transmitting material because the monitoring means will generate one or more signals (depending on the number of lamps 24 and/or other signal generating means) irrespective of whether or not the supply of softening agent is observable.

The softening agent which forms the supply 33 can be furnished in granular, pulverulent or any other form, as long as the volume of the supply changes in response to partial or complete exhaustion of its water softening capacity. The top and bottom walls of the bellows 23 are foraminous so that the stream of water which issues from the outlet 28 of the container 13 can pass through the supply 33 of softening agent on its way into the upper end portion 25a of the conduit 25. It goes without saying that the housing 11 contains means for preventing leakage of water from the outlet 28 anywhere else but into the conduit 25. The entire sidewall of the bellows 23 may but need not be deformable, as long as the deformability of the bellows suffices to ensure that the upper portion 23a can close the switch 24 when warranted in view of the condition of the supply 33 of softening agent therein. It is also possible to replace the bellows 23 with a receptacle wherein two tubular sections are telescoped into each other so that the upper section can move toward the switch 24 or toward the switches 24', 24" when the supply 33 of softening agent expands. Still further, the bellows 23 or an equivalent receptacle can be designed in such a way that it extends laterally or downwardly rather than upwardly, or laterally and upwardly and/or downwardly, as long as the direction of movement of one or more selected portions of the bellows or another suitable receptacle is toward the normally open switch or switches of the signal generating means.

The volumetric change of the supply 33 of softening agent can be relatively small or quite pronounced, for example, in the range of up to 20%. Such pronounced volumetric change is amply sufficient to ensure reliable actuation of one or more switches when the supply 33 of softening agent is ready to be discarded or replaced. The volumetric change takes place simultaneously with a detectable change of color or hue if the nature of selected softening agent is such that its volume changes at a time when its color changes to thus indicate, in two different ways, that the water softening action of the contents of the bellows 23 or an analogous receptacle is unsatisfactory.

It has been found that one or more lamps which emit red light are particularly effective to ensure that a change of volume of the supply of softening agent in the bellows 23 or an analogous expandable or deformable receptacle will be readily detected by the user of the appliance. It has also been found that detection of a red signal is even more likely if such signal is produced next to the customary on-off switch of the appliance. As a rule, or at least in many coffee making machines, tea making machines, cappuccino making machines and espresso making machines, the on-off switch is installed at the front side of the housing. As mentioned above, the signal generating device or devices (such as one or more lamps or one or more devices for the generation of acoustic signals) can be placed next to or at any desired practical distance from the receptacle for the supply of softening agent.

The drawing shows that the water softening unit 22 and the monitoring means are installed in an appliance which constitutes a coffee making machine. However, it is clear that such water softening unit and the associated monitoring means (with one or more signal generating devices) can be utilized with equal advantage in many other appliances wherein the water softening unit and the monitoring means of the present invention can be put to use are tea makers, cappuccino makers, espresso makers and steam irons. It is immaterial whether the water consuming or processing appliance is or is not an electrically operated appliance.

It is further within the purview of the invention to modify the illustrated water softening unit and the associated monitoring means in such a way that the monitoring means responds to volumetric changes and/or to changes in color of the supply of softening agent. For example, a color-sensitive detector can be used in lieu of or jointly with the monitoring means of FIGS. 2 or 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

I claim:

1. An appliance comprising a vessel arranged to store a body of water, such as magnesium- and/or calcium-containing tap water, said vessel having a water outlet; means for softening water which issues from said outlet, including a supply of water softening agent which is contacted by water and the composition of which is such that its volume changes when its water softening capacity is reduced or exhausted; and means for monitoring the volume of the supply of softening agent.

2. The appliance of claim 1, wherein said monitoring means includes means for generating signals denoting the changes of volume of said supply of softening agent.

3. The appliance of claim 2, wherein said signal generating means includes means for generating visible signals.

4. The appliance of claim 1, wherein the composition of softening agent is such that the volume of the supply of softening agent increases when its water softening capacity is reduced or exhausted.

5. The appliance of claim 4, wherein said softening means further comprises a deformable receptacle for the supply of softening agent.

6. The appliance of claim 5, wherein said receptacle includes a portion which moves along a predetermined path in response to expansion of said supply, said monitoring means comprising means for generating signals denoting the increase of volume of said supply of softening agent, said signal generating means including a portion located in said path and being displaceable by said portion of said receptacle.

7. The appliance of claim 5, wherein said receptacle includes a bellows.

8. The appliance of claim 1, wherein said outlet is located at a level above said supply of softening agent.

9. The appliance of claim 1, further comprising at least one water consuming device and means for conveying softened water from said softening means to said at least one consuming device.

10. The appliance of claim 9, wherein said at least one consuming device includes at least one electric water heater.

* * * * *